Sept. 10, 1929.   R. L. PETTIT ET AL   1,727,670
SUNSHADE
Filed Aug. 30, 1926
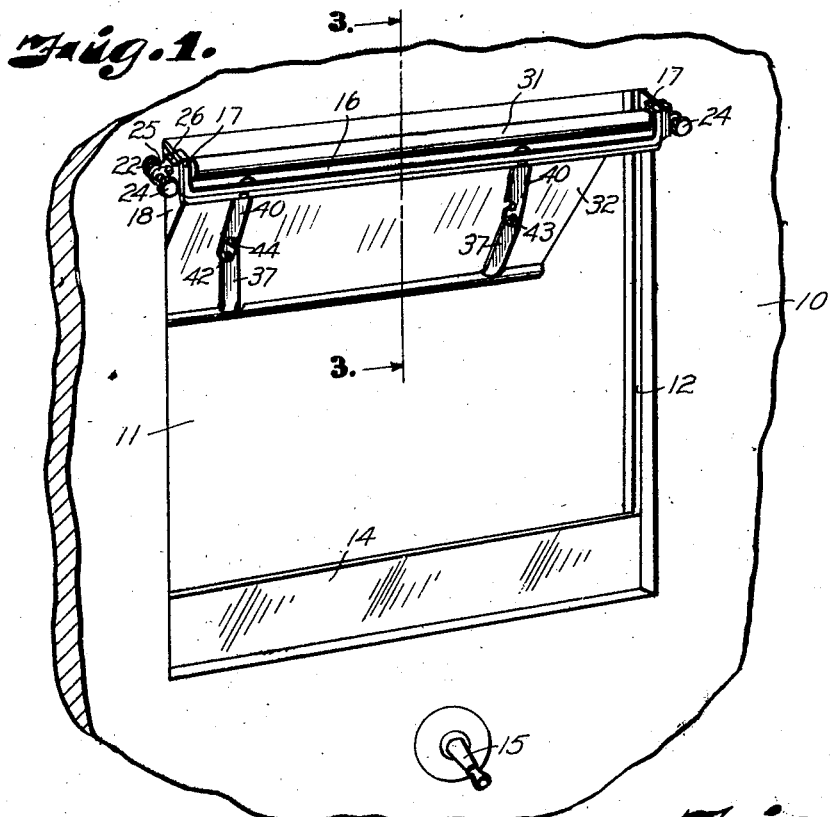
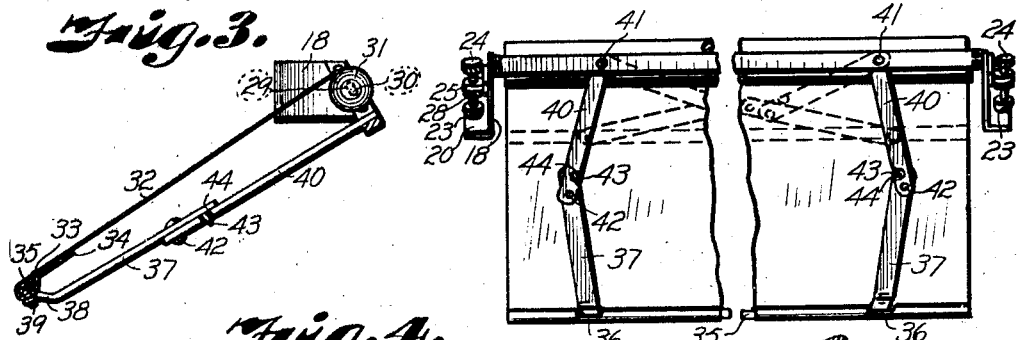
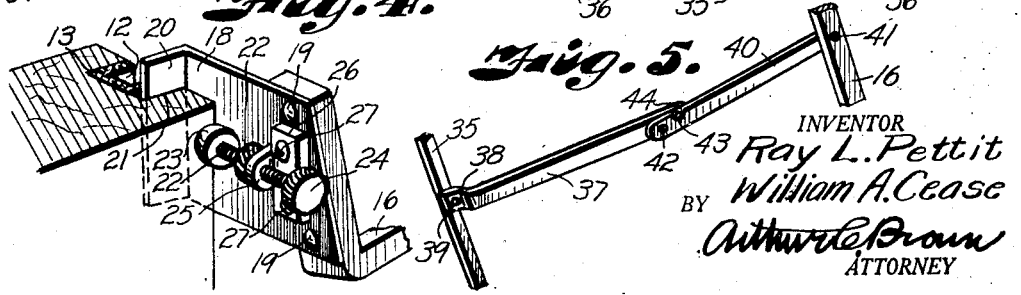
INVENTOR
Ray L. Pettit
William A. Cease
BY
Arthur L. Brown
ATTORNEY

Patented Sept. 10, 1929.

1,727,670

UNITED STATES PATENT OFFICE.

RAY L. PETTIT AND WILLIAM A. CEASE, OF TULSA, OKLAHOMA; SAID PETTIT ASSIGNOR TO SAID CEASE.

SUNSHADE.

Application filed August 30, 1926. Serial No. 132,480.

Our invention relates to sunshades and more particularly to sunshades adapted for use on vehicles.

It is the purpose of our invention to provide a sunshade that is adapted to be supported at a window opening such as the window opening in an automobile and particularly to such a device that is adapted to be secured by means engaging in the grooves usually provided for sliding windows in vehicles.

It is a further purpose of our invention to provide adjustable means for supporting the sunshade comprising clamping means having a portion engaging in the sliding grooves for the windows.

It is still another object of our invention to provide a curtain supporting device having arms for holding the curtain in extended position, said arms being held in extended position by means of the spring tension of the winding means of the shade, which is preferably made of flexible material and is preferably mounted upon the ordinary shade roller having a spring therein for winding up the material on the roller.

Other objects and advantages of our invention will appear as the description of the accompanying drawings proceeds. However, we desire to have it distinctly understood that we do not intend to limit ourselves to the exact details shown or described, but that we intend to include as part of our invention all such obvious changes and modifications of parts as would occur to a person skilled in this art and as would fall within the scope of the claims.

In the drawings:

Fig. 1 is a fragmentary view partly in perspective of a portion of a closed vehicle viewed from the interior thereof and my improved sunshade in position adjacent the window opening.

Fig. 2 is an elevational view looking upwardly at the sunshade.

Fig. 3 is a section taken substantially on the line 3—3 of Fig. 1.

Fig. 4 is an enlarged fragmentary view partly in section and partly in perspective of one of the clamping brackets in position for supporting the sunshade, and Fig. 5 is a fragmentary detached perspective view of a portion of the means for holding the sunshade in extended position.

Referring in details to the drawings:

Our improved sunshade is shown as being applied to a vehicle having a wall portion 10 provided with a window opening 11 which has vertical grooves 12 along the side edges thereof in which any suitable cushioning material, such as the felt strip 13, is mounted and which the window 14 slidably engages, the same being operated in the usual manner by a crank 15.

Our improved sunshade comprises a frame having the elongated body portion 16 provided with upturned end portions 17. Said end portions 17 are secured to bracket members 18 in any desirable manner as by means of the rivets 19. The bracket members are provided with right-angular end portions or flanges 20 that are adapted to engage in the grooves 12 between the inner wall portions 21 thereof, and the felt lining 13. The bracket members 18 are preferably or relatively thin material, being preferably of sheet metal so that the same will not undesirably reduce the width of the grooves 12 and thus will not interfere with the operation of the window 14 in its sliding movements.

The flanges, or right-angular end portions 20 are each held in clamping engagement with the wall 21 by means of a screw-threaded clamping member 22 having a head 23 that is preferably of resilient material such as rubber at one end thereof, and which is provided with a knurled head 24 for rotating the same. Member 22 screw-threadedly engages with a threaded opening in the ear 25 provided on the bracket member 26 which is secured to the bracket 18 in any desired manner, as by means of the screws 27. In order to hold the clamping members in any adjusted position, a knurled lock nut 28 may be provided. It is of course to be understood that one of the clamping devices is associated with each of the brackets 18 and that the same will firmly hold the bracket members in any desired adjusted position along the grooves 12.

The elongated body portion 16 of the frame is preferably made of a bar substantially rectangular in cross-section and the upturned end portions 17 are preferably provided with openings therein to receive the usual shade roller which is utilized in the present invention. The shade roller as is well known is usually provided with a rounded pivot member at one end thereof that engages in a suitable opening in the supporting bracket of the shade and at the opposite end is provided with a flattened pin projecting from the end thereof, which is received in a suitable slotted member to hold the same against rotation to tension the spring within the roller. As this structure is well known, it is deemed unnecessary to illustrate the same in the present case. The important feature in the present case is that one of the brackets 17 is provided with a slot 29 that receives the flattened pin 30 on one end of the shade roller 31, the opposite end thereof being journaled in the other end 17 in any suitable manner.

Mounted on the roller 31 in a well known manner is the flexible material 32, said flexible material forming the shade and being preferably of fabric, and being adapted to be wound up on the roller 31 in the usual manner. The outermost end of the flexible fabric 32 is preferably provided with a pocket 33 formed therein by providing a two-ply portion at the edge thereof, the extreme edge portion of the material 34 being secured to the body portion 32 to form such a pocket. Within the pocket 33 a rod-like member 35 is mounted, said rod-like member being preferably rectangular in cross-section as shown in Fig. 5 and exposed at the cutaway portions 36 in the material 32 at the pocket 33.

Engaging with the exposed portions of the rod 35 at the cutaway portions 36 in the material 32 are the links 37, said links being offset as at 38 and the offset ends being secured pivotally to the rod 35 by means of the rivets 39. Links 40 are also provided, which are pivoted to the members 16 by means of the rivets or other pivot members 41 and are secured adjacent the opposite ends thereof to the links 37 by means of the pivot members 42 which may be in the form of rivets.

The pivot members 42 are located a short distance from the ends of the links 37 and pins 43 are provided, projecting from the links 37 and adapted to engage in notches 44 in the links 40 when the parts are in the position shown in Fig. 2, to thus hold the sunshade, formed of the material 42, in extended position.

It will be seen that when the parts are in the position shown in Fig. 2, the pins 43 will have moved past center and the winding spring in the roller 31 will tend to hold the pins 33 in the notches 44, thus tending to hold the parts in such a position that the sunshade will be in extended position. When it is desired to roll up the shade the ends of the links 37 and 40 that are pivoted together are moved toward each other so as to remove the pins 43 from the notches 44 and permit the links to swing inwardly toward each other to the dotted line position shown in Fig. 2, the spring within the shade roller 31 holding the parts in retracted position.

What we claim and desire to secure by Letters-Patent is:

1. In an awning support of the character described including a rigid transverse curtain-supporting bar, a bar-supporting bracket member fixed to one end of said bar and having a laterally turned flange adapted for engaging in a window groove, a threaded bearing fixed to said bracket member, and a screw adjustable in said bearing cooperative with said flange in attaching the bracket to a window frame.

2. An awning support of the character described including a rigid transverse frame bar having turned ends provided with opposed openings to receive the aligned pins of the curtain roller, and bar-supporting means including a bracket fixed to one of said turned ends and having a laterally turned flange adapted for engaging in a window groove, and a clamp on said bracket cooperative with said flange in attaching the bracket to a window frame.

In testimony whereof we affix our signatures.

RAY L. PETTIT.
WILLIAM A. CEASE.